INVENTORS
JAMES S. GALLO
JAMES R. SHERRITT

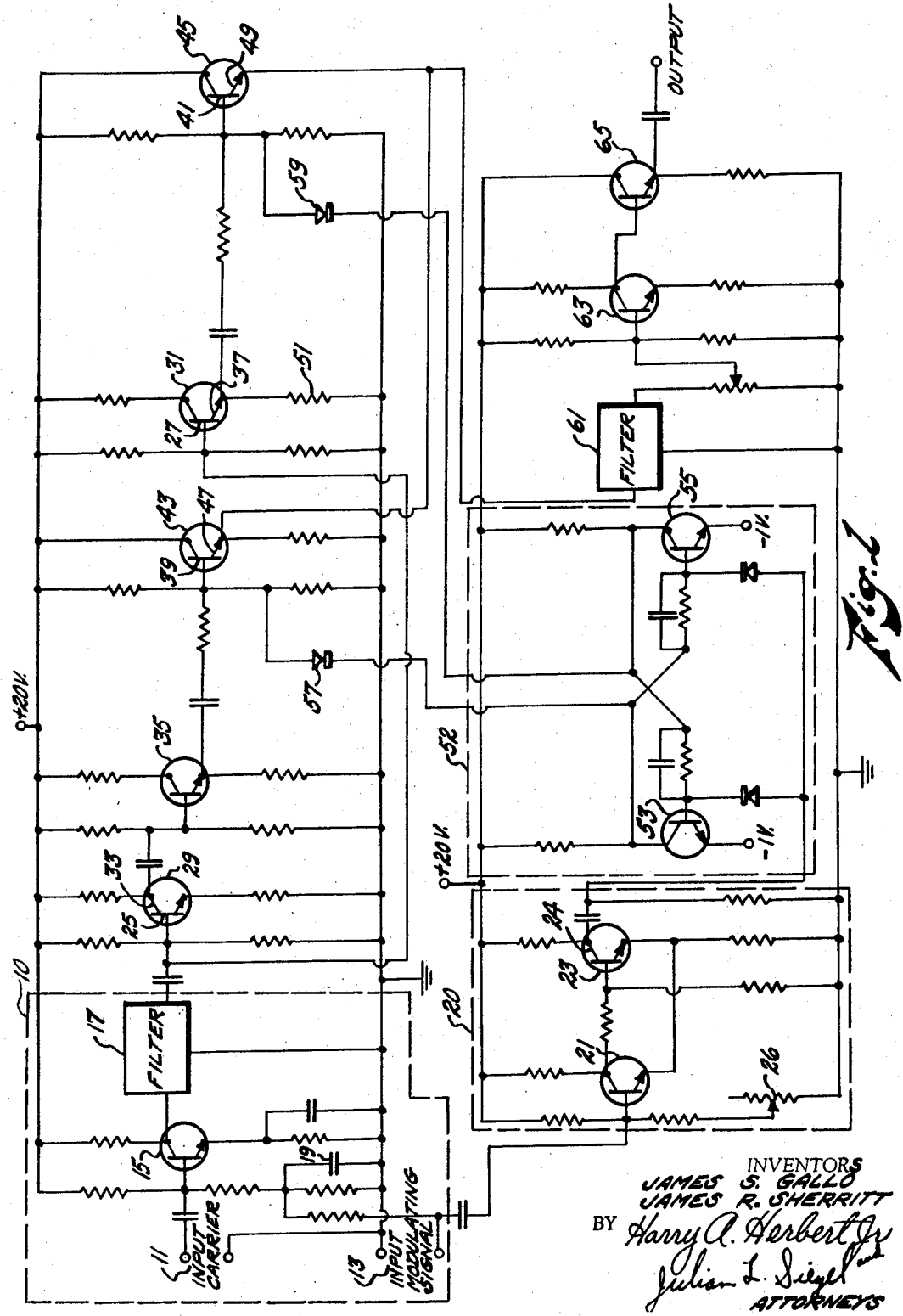

United States Patent Office 3,506,931
Patented Apr. 14, 1970

3,506,931
GYROSCOPE TEST TABLE OSCILLATOR
James S. Gallo and James R. Sherritt, Alamogordo, N. Mex., assignors to the United States of America as represented by the Secretary of the Air Force
Filed Feb. 21, 1967, Ser. No. 618,309
Int. Cl. H03c 1/00
U.S. Cl. 332—31     3 Claims

ABSTRACT OF THE DISCLOSURE

An apparatus for controlling a gyroscope test table by causing a carrier signal to shift phase whenever an input signal passes through zero amplitude. The input signal is phase shifted and fed to a Schmitt trigger which triggers a flip flop. The input signal also modulates a carrier signal from which a second carrier is formed 180° out of phase from the first. The state of the flip flop determines which carrier is the output.

The invention described herein may be manufactured and used by or for the United States Government for governmental purposes without payment to us of any royalty thereon.

This invention relates to a control circuit, and more particularly to a gyroscope or an inertial test table oscillator control circuit. The function of a gyroscope test table control oscillator is to provide a signal having an amplitude modulated voltage for servo amplifiers that control the inertial test table motion. The signal can be 100 percent amplitude modulated at a selectable signal frequency. By switching, detecting and signal summing techniques, the output of this circuit can be a 100 percent modulated signal which switches phase by 180° with respect to the input (or reference) signal every time the modulated signal passes through zero. The output carrier phase is switched by 180° as an input carrier approaches zero amplitude of each negative peak of the modulating frequency sine wave.

The invention has the capability of oscillating inertial component test tables at selectable frequencies. This angular oscillatory motion can be used to study certain areas arising in inertial guidance systems due to this motion. This invention can use existing test table control systems without modification by providing proper electronic signals to the existing servo amplifiers. As an example of the use of the invention, it can be used to oscillate an air bearing test table and also a roller bearing test table. These tests determine the maximum amplitude of angular displacement and maximum useful frequency range of the oscillation on these tables.

It is an object of this invention to provide an oscillator control circuit.

It is another object to provide a drive and control circuit for gyroscope test tables.

It is still another object to provide an oscillator control circuit responsive to changes in an input signal.

These and other advantages, features and objects of the invention will become more apparent from the following description taken in connection with the illustrative embodiments in the accompanying drawings, wherein:

FIGURE 1 is a circuit diagram of an embodiment of the invention; and

Figure 2A:
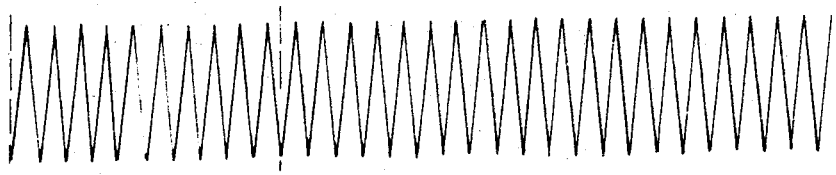
FIGURES 2a–2g are waveform diagrams at various points in the circuit.

Referring to FIGURE 1, the circuit will be explained using an input carrier of 1 kc. and a modulating signal between zero and 1 kc. Also, the collector bias of the transistors is +20 volts and the emitter bias of flip flop 52 is −1 volt.

The first section is modulator circuit 10 comprising transistor 15 and a 1 kc. band pass filter 17. The output of modulator circuit 10 is an amplitude modulated 1 kc. signal. Capacitor 19 is the base circuit of transistor 15 is used to produce a phase shift between the amplitude modulated signal and the input to Schmitt trigger circuit 20. The phase shift is necessary in order for Schmitt trigger 20 to switch states at the null of the amplitude modulating carrier signal. This phase shift can be approximately 35 degrees at 5 c.p.s. and increases as the modulating frequency increases. The output of band pass filter 17 is coupled to bases 25 and 27 of transistors 29 and 31 respectively. The output of transistor 29 is taken from collector 33 and coupled to emitter follower 35 to increase the drive capabilities. Since the output of transistor 31 is from emitter 37, it requires no further power amplification. The outputs from transistors 35 and 31 are now 180° out of phase, the output from transistor 35 being in phase with the input carrier signal. These two signals are coupled to bases 39 and 41 of transistors 43 and 45; that is, transistor 35 is connected to transistor 43 and transistor 31 is connected to transistor 45. Transistors 43 and 45 at their respective emitters 47 and 49 use common load resistor 51. The phase of the signal developed across load resistor 51 depends on the state of flip flop 52, comprising transistors 53 and 55.

Flip flop 52 is controlled by Schmitt trigger 20 which is fed by the modulating signal and its output provides flip flop 52 with positive trigger pulses. When the input sine wave is at its most negative point, the modulated carrier at transistors 29 and 31 is approaching a null, depending on the phase shift capacitor 19. At this time the output at collector 24 of transistor 23 changes from +20 volts to +7 volts. As the input sine wave increases from its most negative level the output from transistor 23 changes from +7 volts to +20 volts. Adjustable resistor 26 in base circuit of transistor 21 controls the trigger point. This positive transition triggers flip flop 52 and it is changed from one stable state to the other stable state. This transition will occur at each pulse from Schmitt trigger 20.

Assuming that flip flop 52 is in a state where transistor 53 is conducting and transistor 55 is cut off, base 39 of transistor 43 is at −1 volt through forward bias diode 57. Since diode 59 is reverse bias, transistor 45 is allowed to conduct. When flip flop 52 is triggered, the condition is switched and transistor 43 is allowed to conduct and transistor 45 is held at cut off. When transistor 45 is conducting, the output phase across common emitter load 51 is 180° out of phase with the carrier input. When transistor 43 is conducting, the output is in phase with the carrier output. The output from transistor 43 and transistor 45 is then filtered by the 1 kc. band pass filter to reject the low frequency switching transients generated by flip flop 52. From filter 61 the signal is amplified by amplifier 63 and provided with emitter follower output stage 65 which is capable of driving servo amplifiers.

Figure 2B:
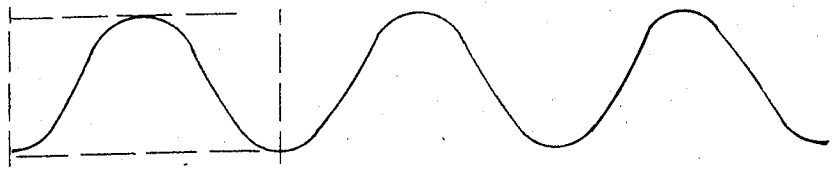
Figure 2C:
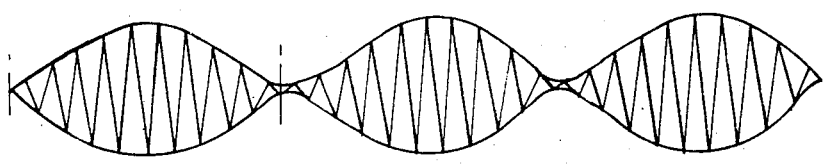
Figure 2D:
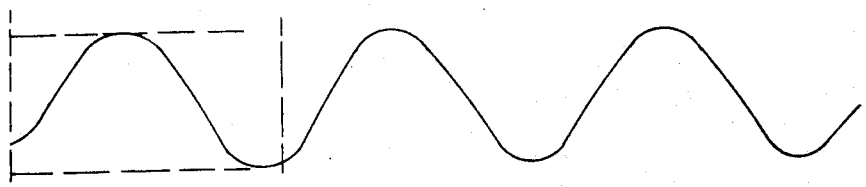
Figure 2E:
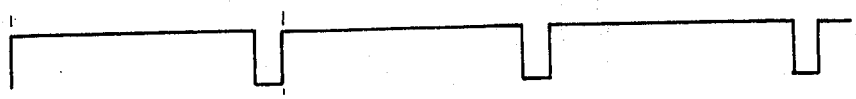
Figure 2F:
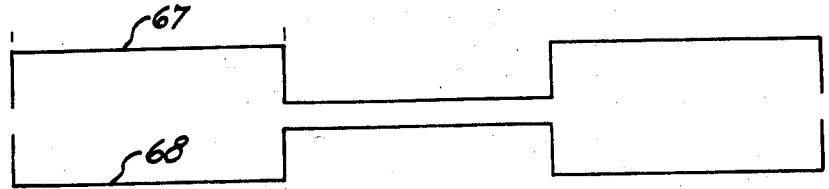
Figure 2G:
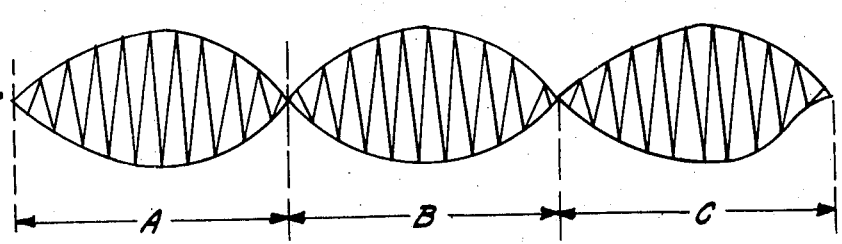

Referring to the wave form diagrams, FIGURE 2a is the carrier signal at input 11; FIGURE 2b is the carrier modulating signal at input 13; FIGURE 2c is the output of filter 17; FIGURE 2d is the input to Schmitt trigger 20 which has been shifted in phase from that of FIGURE 2b; FIGURE 2e is the output of the Schmitt trigger; FIGURE 2f is the output of flip flop 52 with waveform 67 showing the output of transistor 53 and waveform 68 showing the output of transistor 55; FIGURE 2g is the output of filter 61 which shows at interval A, transistor 45 is conducting; at interval B, transistor 43 is conducting, and at interval C, transistor 45 is again conducting.

What is claimed is:
1. A circuit for controlling the motion of inertial test tables comprising:
   (a) a carrier signal source;
   (b) a modulating signal source;
   (c) means for modulating the carrier signal with the modulating signal the modulating means including a phase shifter;
   (d) means for shifting 180° the phase of the modulated signal;
   (e) a first transistor fed by the modulated signal;
   (f) a second transistor fed by the modulated signal 180° out of phase as that fed the first transistor;
   (g) a common load resistor connected to the first and second transistors;
   (h) a Schmitt trigger having an adjustable trigger point connected to the modulating signal source;
   (i) a flip flop having a pair of outputs and triggered by the Schmitt trigger, one output of the flip flop being connected to the first transistor and the other output being connected to the second transistor;
   (j) and a pair of diodes, one each interposed between the flip-flop and the first and second transistors and biased to permit the first and second transistors to alternately conduct dependent upon the state of the flip flop.

2. A circuit for controlling the motion of inertial test tables according to claim 1 wherein the modulating means further includes:
   (a) a third transistor having a base and a collector and fed at the base circuit by the carrier signal source and the modulating means source;
   (b) and a band pass filter connected to the collector of the third transistor.

3. A circuit for controlling the motion of inertial test tables according to claim 2 which further comprises:
   (a) a second filter fed by outputs of the first and second transistors;
   (b) means for amplifying the outputs of the second filter;
   (c) and an emitter follower fed by the amplifying means.

References Cited

UNITED STATES PATENTS 3,229,230  1/1966  Feldman _____ 332—31

ROY LAKE, Primary Examiner

L. J. DAHL, Assistant Examiner

U.S. Cl. X.R.

332—17, 43